(12) United States Patent
Chiu (10) Patent No.: US 9,757,832 B1
(45) Date of Patent: Sep. 12, 2017

(54) SLIDING SEAT DEVICE WITH SURROUNDING STRUCTURE

(71) Applicant: MAXXTRON TECHNOLOGY CO.,LTD., Taichung (TW)

(72) Inventor: Chun-Ling Chiu, Taichung (TW)

(73) Assignee: MAXXTRON TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 15/234,585

(22) Filed: Aug. 11, 2016

(51) Int. Cl.
  *F16C 29/02* (2006.01)
  *B23Q 1/01* (2006.01)
  *B23Q 1/62* (2006.01)
  *B23Q 11/00* (2006.01)

(52) U.S. Cl.
  CPC ............. *B23Q 1/012* (2013.01); *B23Q 1/621* (2013.01); *B23Q 11/0017* (2013.01)

(58) Field of Classification Search
  CPC .... B23Q 1/012; B23Q 1/621; B23Q 11/0017; F16C 29/001
  See application file for complete search history.

(56) References Cited

U.S. PATENT DOCUMENTS

| 9,011,053 B2* | 4/2015 | Sugiyama | B23Q 1/012 409/185 |
| 2015/0081078 A1* | 3/2015 | Frascati | B23C 1/002 700/114 |
| 2016/0224008 A1* | 8/2016 | Heiniger | B23Q 1/012 |

* cited by examiner

*Primary Examiner* — Thomas R. Hannon
(74) *Attorney, Agent, or Firm* — WPAT, P.C., Intellectual Property Attorneys; Anthony King (57) ABSTRACT

A sliding seat device with surrounding structure, which is applied to a bridge type machining center, includes a main body provided with a sliding portion; a sliding seat slidingly disposed on the sliding portion and reciprocating along an X-axis direction of the main body, the sliding seat provided with a housing; a sliding pillar passing through the housing and reciprocating along a Z-axis direction of the main body, one side of the sliding pillar provided with a protruding rail disposed along the Z-axis direction of the main body; an assistant plate connected with the sliding seat and facing the protruding rail; and an adjusting unit passing through the assistant plate and pushing against the protruding rail, the adjusting unit correcting a vertical bias between the sliding pillar and the main body.

12 Claims, 8 Drawing Sheets

SLIDING SEAT DEVICE WITH SURROUNDING STRUCTURE

BACKGROUND OF THE INVENTION

1. Field of the Invention

The present invention relates to sliding devices, and more particularly, to a sliding seat device with surrounding structure for a bridge type machining center.

2. Description of the Related Art

Ordinarily, a bridge type machining center is mainly used to process large parts, so that the volume of a bridge type machining center is usually relatively large.

A conventional bridge type machining center structurally includes a main body, a sliding seat, and a sliding pillar. Two sides of the main body are provided with a pillar, respectively, with a beam transversely disposed between the two pillars. Two linear rails are disposed on the beam, such that the two pillars reciprocate along a Y-axis direction which extends in vertical to the main body. The sliding seat is slidingly disposed on the beam, such that the sliding seat reciprocates along an X-axis direction which extends in parallel to the main body. The sliding pillar slidingly passes through the sliding seat, such that the sliding pillar reciprocates along a Z-axis direction which perpendicularly extends through the bottom face and the top face of the main body.

Due to the large scale of a bridge type machining center, the pillars are usually 1-3 meters long. When the two pillars reciprocate along the Y-axis direction of the main body, the sliding seat and the sliding pillar are unable to resist a counter force produced against the Y-axis. As a result, during the processing, a vertical bias of the sliding pillar is easily produced, causing a lower stability and accuracy of the processing.

Due to the lack of an adjusting mechanism between the sliding pillar and the sliding seat, when the sliding pillar is vertically biased, the correctness is unable to be immediately provided. After a long period of usage, the sliding pillar easily deforms. Therefore, the industry needs a solution for resolving the issue that the bridge type machining center is only capable of resisting a unidirectional counterforce. Also, an adjusting mechanism shall be provided, so as to provide an immediate adjustment whenever a vertical bias of the sliding pillar occurs and thus prevent the deformation of the sliding pillar from happening.

SUMMARY OF THE INVENTION

For improving aforementioned issues, embodiments of the present invention disclose a sliding seat device with surrounding structure. An assistant plate is disposed on one lateral side of the sliding pillar, with adjusting units passing through the assistant plate, such that the assistant plate is pressed against the protruding rail on one side of the sliding pillar, whereby the biasing angle of the sliding pillar along the Z-axis direction of the main body is corrected. Therefore, an adjusting mechanism is provided, so as to prevent the sliding pillar from deforming due to a long period of usage.

For achieving the objectives above, embodiments of the present invention provide a sliding seat device with surrounding structure, comprising:

a main body provided with a sliding portion;

a sliding seat slidingly disposed on the sliding portion, the sliding seat reciprocating along an X-axis direction of the main body, the sliding seat provided with a housing;

a sliding pillar passing through the housing, the sliding pillar reciprocating along a Z-axis direction of the main body, one side of the sliding pillar provided with a protruding rail disposed along the Z-axis direction of the main body;

an assistant plate connected with the sliding seat and facing the protruding rail; and an adjusting unit passing through the assistant plate and pushing against the protruding rail, the adjusting unit correcting a vertical bias between the sliding pillar and the main body.

Preferably, three sides of the sliding pillar excluding the side on which the protruding rail is disposed are provided with at least one sliding device, respectively, such that the sliding pillar is allowed to reciprocate along the Z-axis direction of the body by use of the at least one sliding device.

Preferably, each sliding device is provided with a sliding groove and a sliding rail. Each sliding groove is concavely disposed in the housing along the Z-axis direction of the main body. Each sliding rail is disposed on one side of the sliding pillar along the Z-axis direction of the main body.

Preferably, the adjusting unit is provided with a resisting member and a correcting member. The resisting member pushes against the protruding rail. The correcting member is screwedly fastened to the resisting member and screwedly disposed on one side of the assistant plate opposite to the side thereof facing the protruding rail.

Preferably, the correcting member is provided with a moderating portion pushing against the assistant plate, such that a correcting distance is produced between the correcting member and the assistant plate. Adjusting the correcting distance enables the resisting member to move against the Y-axis direction of the main body.

With such configuration, the main objective of the present invention is that the three sides of the sliding seat contacting the sliding pillar are provided with at least one sliding device, respectively, and the sliding pillar is provided with the protruding rail against which the adjusting unit pushes. When the present invention moves along the X-axis or Y-axis direction of the main body, the counter force produced thereof is resisted, such that the sliding pillar is prevented from biasing, so as to improve the deformation issue after a long period of usage.

Another objective of the present invention is that when the sliding pillar slightly deforms due to tool collision, the vertical degree of the sliding pillar against the main body is immediately corrected by the adjusting unit. With the resisting member pushing against the protruding rail, and by adjusting the correcting distance for the resisting member to move along the Y-axis direction of the main body, the bias angle of the sliding pillar is corrected. Therefore, an immediate correctness is provided to the biasing sliding pillar, so as to overcome the deformation issue and increase the service life of the present invention.

Another objective of the present invention is that, with the assistant plate slidingly disposed on the beam and the adjusting unit pushing against the sliding pillar, the weight of the sliding seat is supported, such that the sliding deformation caused after a long period of usage is prevented.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
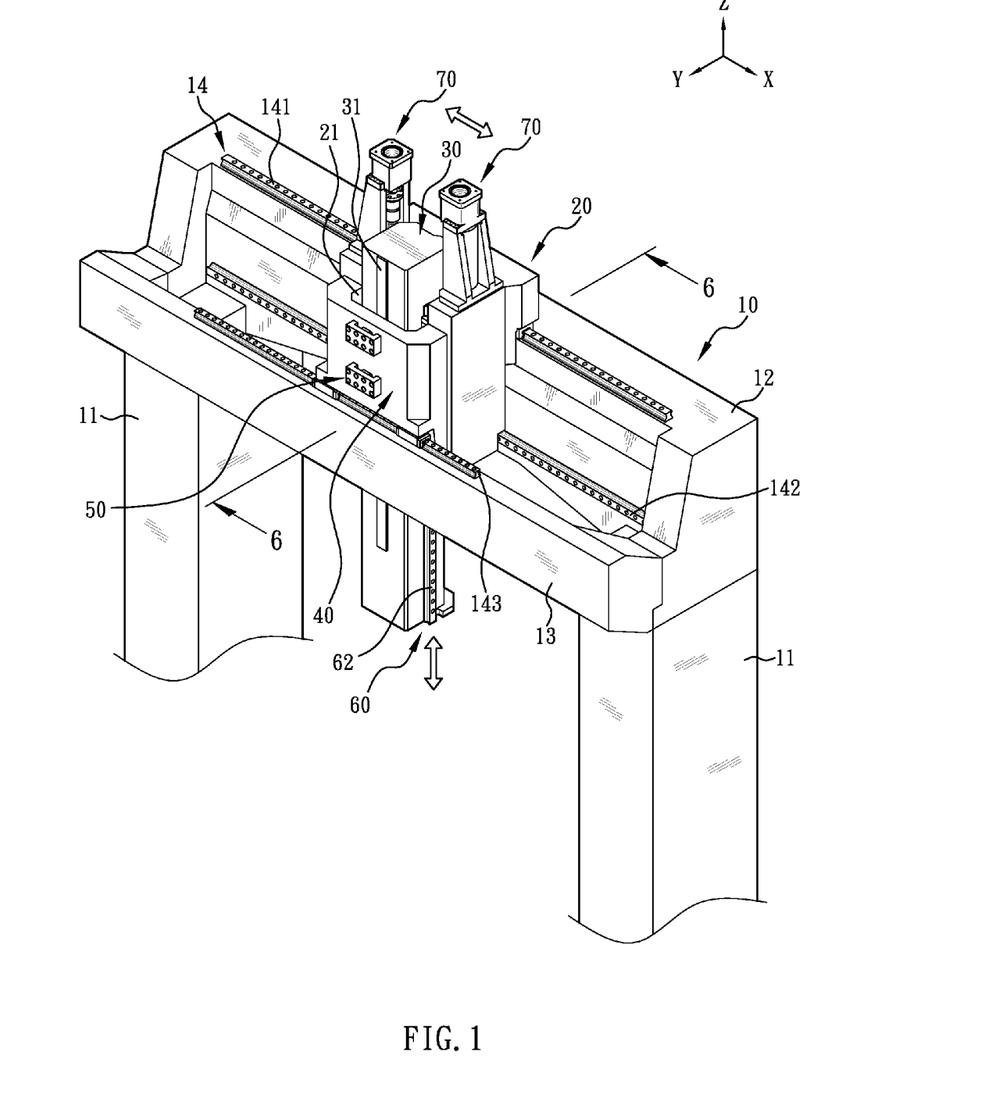
FIG. 1 is a perspective view of an embodiment in accordance with the present invention.
Figure 2:
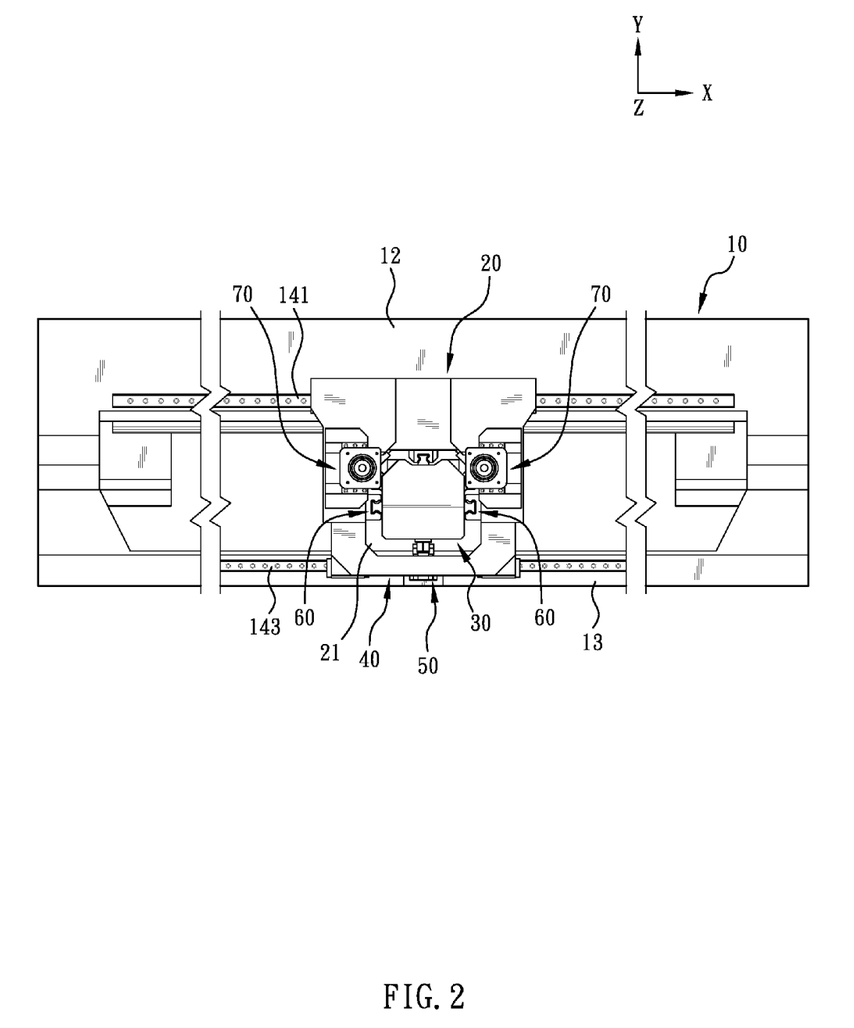
FIG. 2 is a partial top view of the embodiment in accordance with the present invention.
Figure 2A:
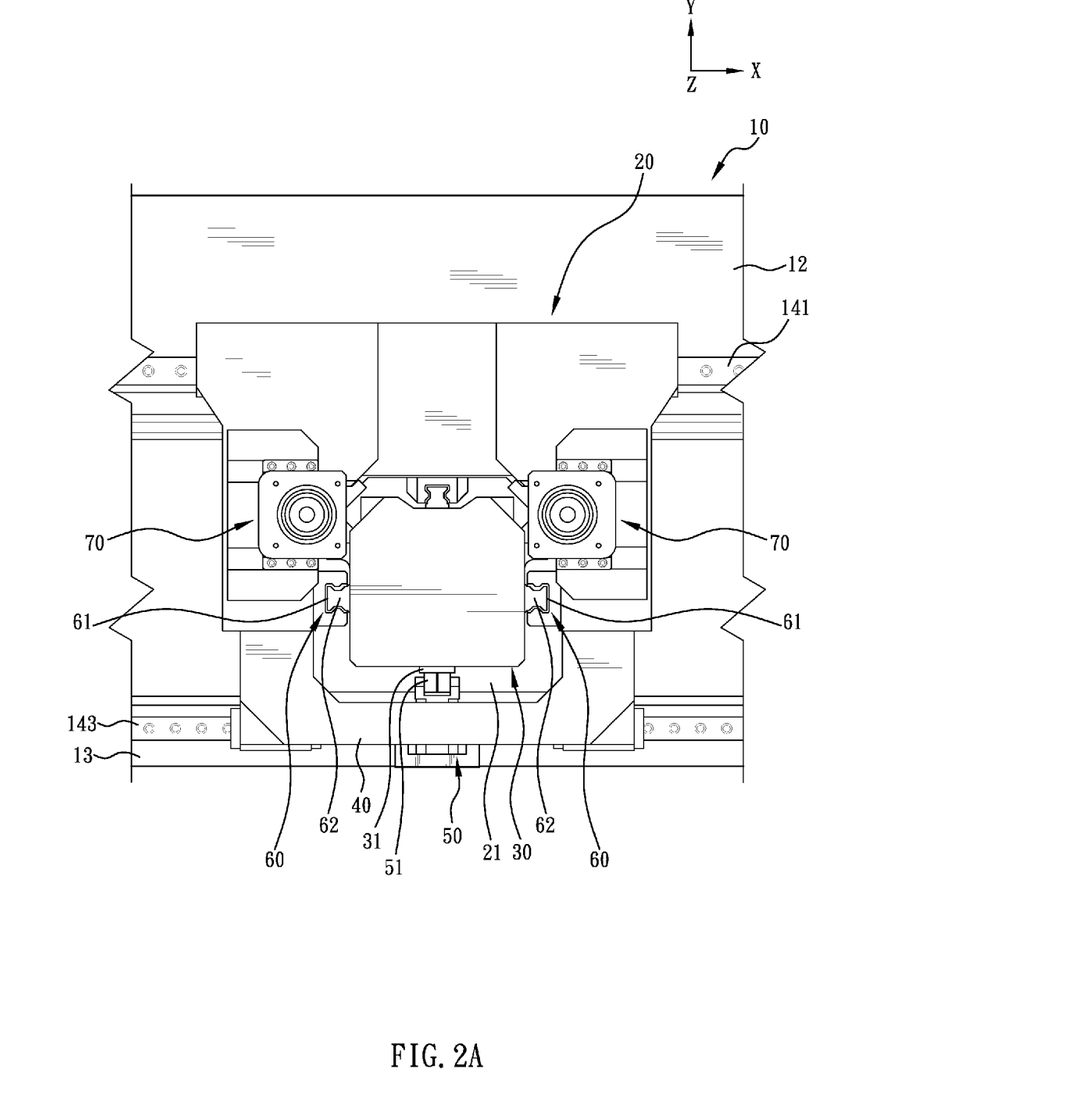
FIG. 2A is a partially enlarged view of FIG. 2.
Figure 3:
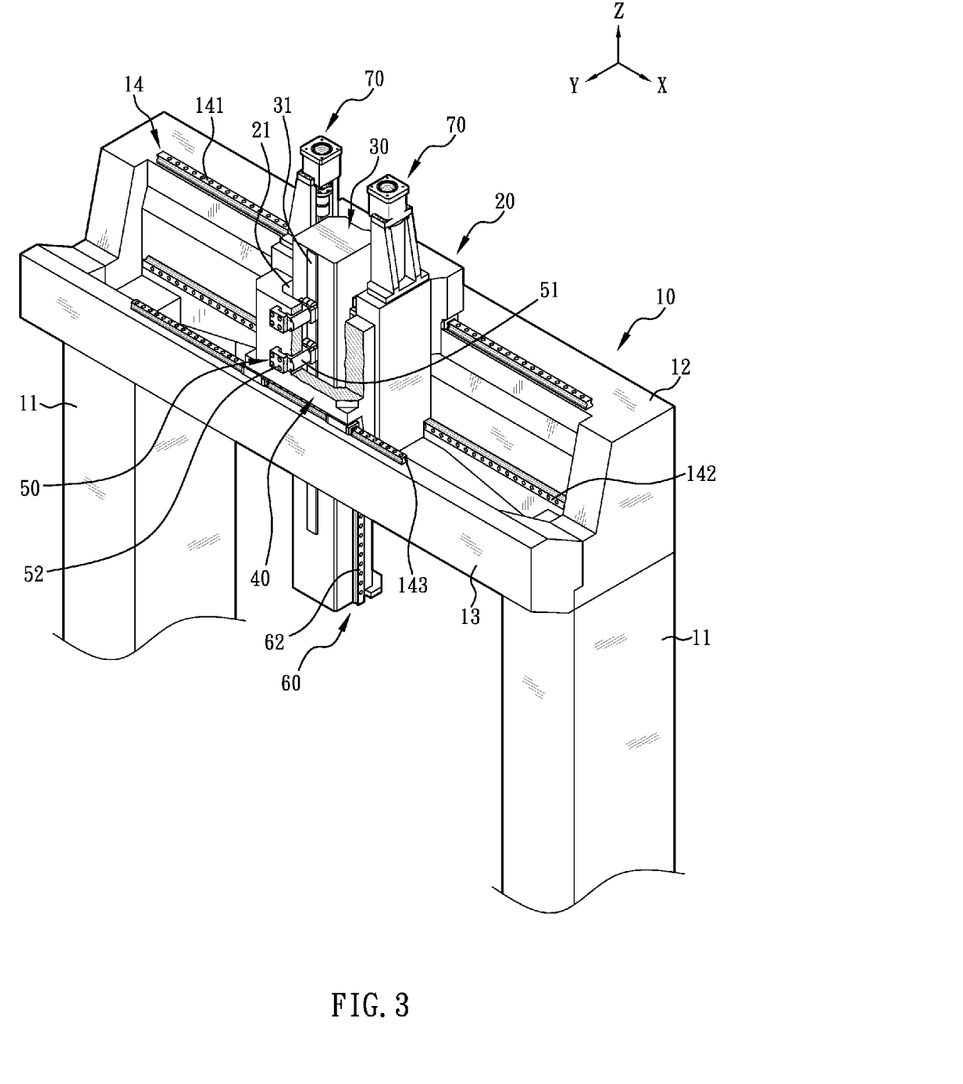
FIG. 3 is a partially sectional perspective view of the embodiment in accordance with the present invention, illustrating the adjusting member pushing against the protruding rail.
Figure 4:
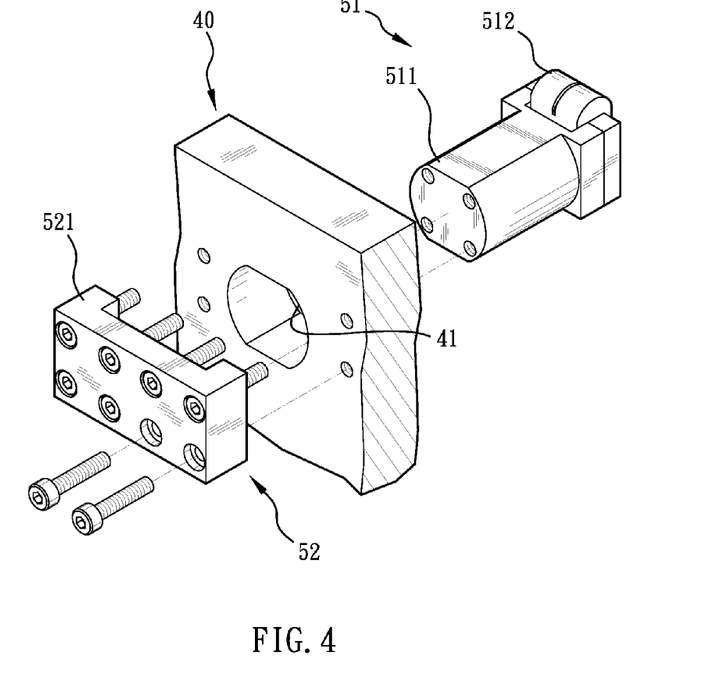
FIG. 4 is an exploded view of the adjusting unit.
Figure 5:
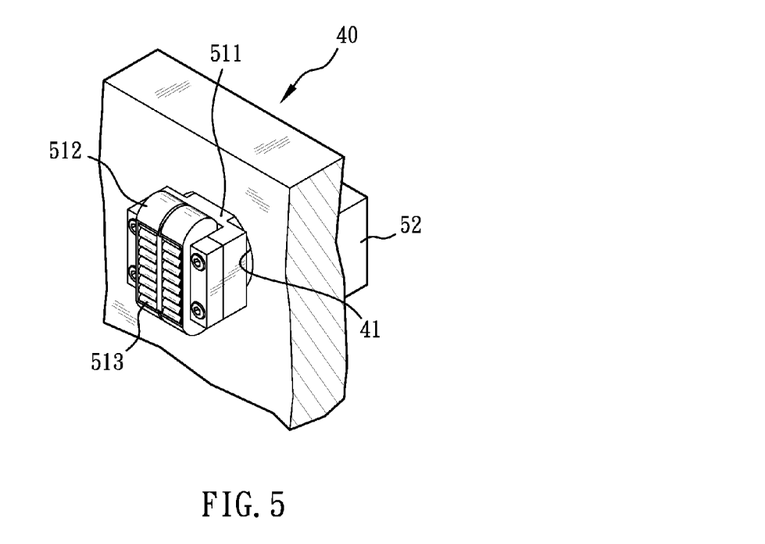
FIG. 5 is a perspective view of the adjusting unit, illustrating the rolling portion of the resisting member comprising plural needle rollers.
Figure 6:
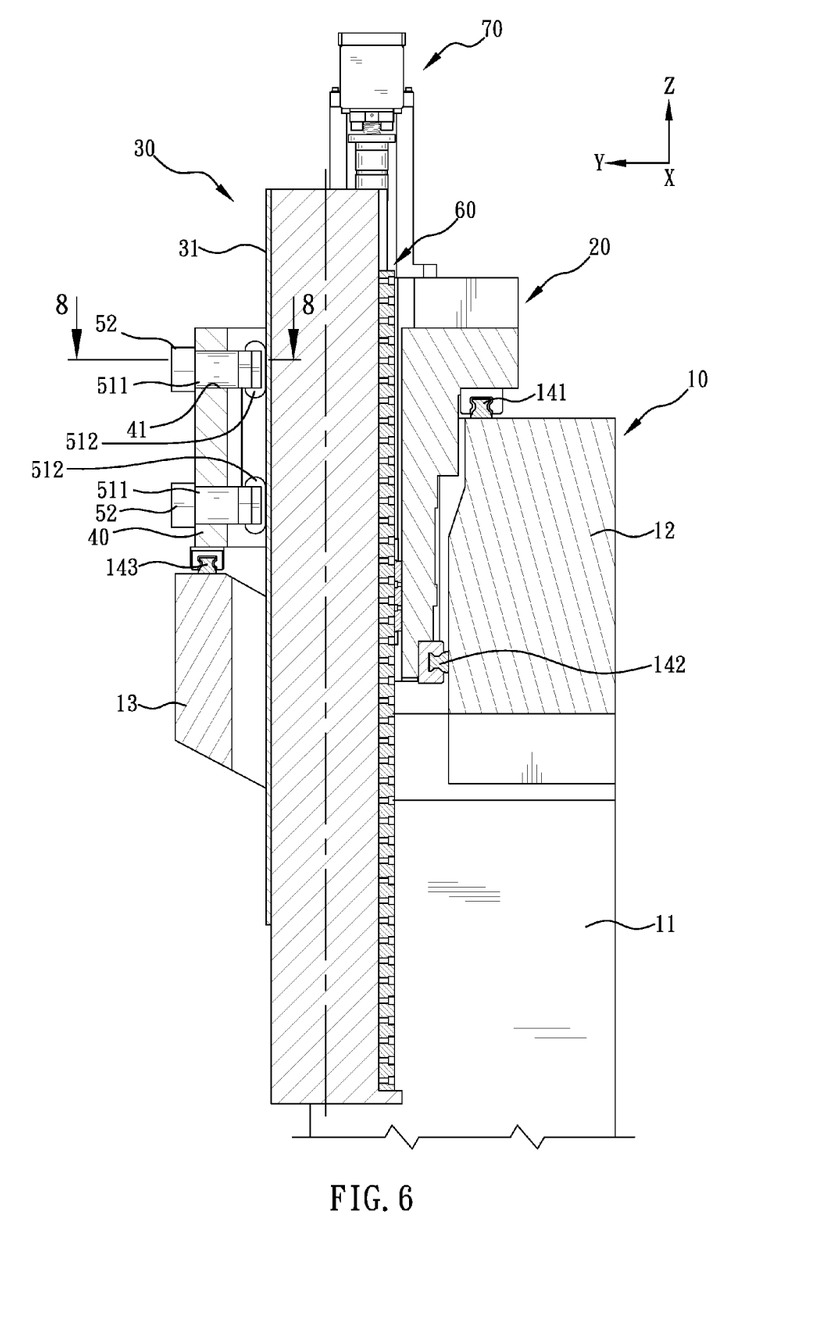
FIG. 6 is a cross-sectional view taken along 6-6 of FIG. 1, illustrating the sliding pillar being arranged in parallel to the Z-axis direction of the main body.
Figure 7:
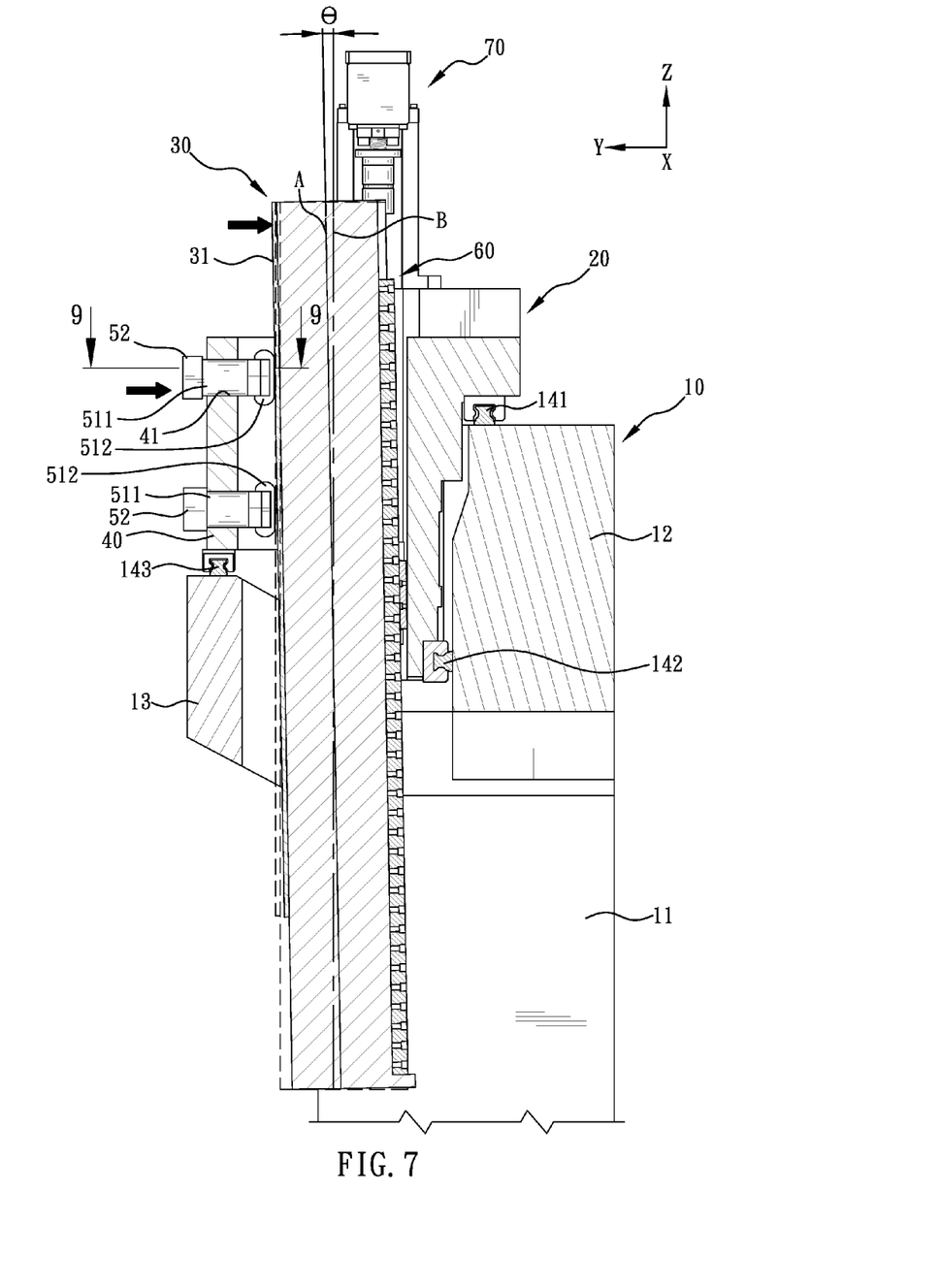
FIG. 7 is another cross-sectional view taken along 6-6 of FIG. 1, illustrating the adjusting unit correcting a bias of the sliding pillar against the main body along the Z-axis direction.
Figure 8:
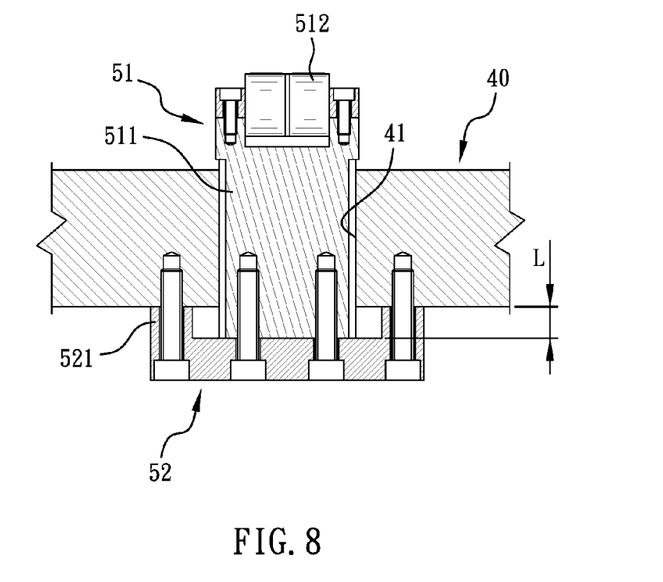
FIG. 8 is a cross-sectional view taken along 8-8 of FIG. 6, illustrating the moderating portion not yet being grindingly adjusted.
Figure 9:
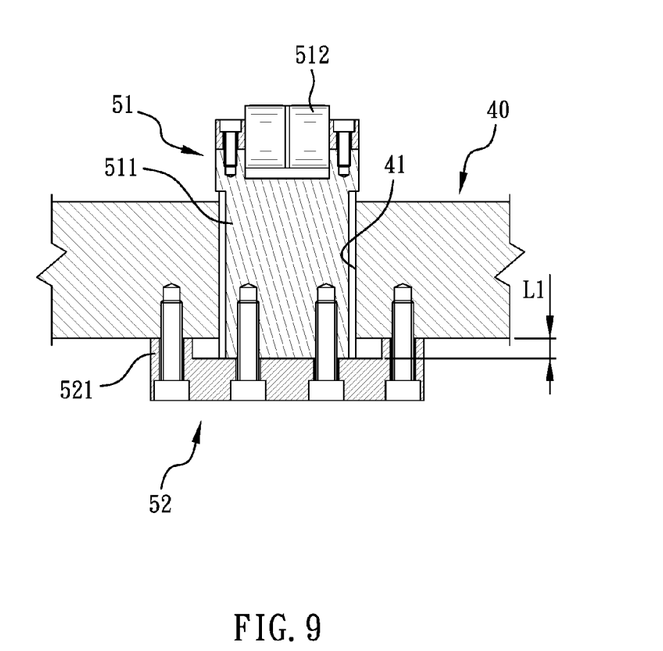
FIG. 9 is a cross-sectional view taken along 9-9 of FIG. 7, illustrating the moderating portion being grindingly processed, such that the correcting distance L varies into the correcting distance L1.

Referring to FIG. 1 to FIG. 9, embodiments of the present invention provide a sliding seat device with surrounding structure, which is applied to a bridge type machining center, comprising a main body 10, a sliding seat 20, a sliding pillar 30, an assistant plate 40, and an adjusting unit 50. With the assistant plate 40 disposed on one side of the sliding pillar 30 and the adjusting unit 50 passing through the assistant plate 40 to push on one side of the sliding pillar 30, the bias angle between the sliding pillar 30 and the main body 10 along the Z-axis direction is corrected. Therefore, an adjusting mechanism is provided to prevent the sliding pillar 30 deformation due to a long period of usage from happening.

The main body 10 has two sides thereof provided with a pillar 11, respectively, and plural beams transversely disposed between the two pillars 11. The two pillars 11 are disposed on the bridge type machining center. In the embodiments of the present invention, the two beams are provided, respectively a first beam 12 and a second beam 13. The height of the first beam 12 is higher than the height of the second beam 13. The sliding seat 20 is disposed on the first beam 12, and the assistant plate 40 is disposed on the second beam 13.

The main body 10 is provided with a sliding portion 14 which is formed in plural linear rails, such that the sliding seat 20 and the assistant plate 40 are slidingly disposed on the sliding portion 14. In The embodiments of the present invention, the linear rails are provided in a number of three, respectively a first linear rail 141, a second linear rail 142, and a third linear rail 143. The first linear rail 141 and the second linear rail 142 are disposed on the first beam 12; the third linear rail 143 is disposed on the second beam 13. The height of the first linear rail 141 disposed on the first beam 12 is higher than height of the second linear rail 142 disposed on the first beam 12. The height of the third linear rail 143 disposed on the second beam 13 is higher than the height of the second linear rail 142 disposed on the first beam 12.

The sliding seat 20 is slidingly disposed on the first linear rail 141 on the first beam 12, wherein the sliding seat 20 is triggered by a driving source (not shown in the drawings) to reciprocate along the X-axis direction of the main body 10. In addition, the sliding seat 20 is provided with a housing 21, wherein the sliding pillar 30 is slidingly disposed in the housing 21 and reciprocates along the Z-axis direction of the main body 10. Further, two sides on top of the sliding seat 20 is provided with a power source 70 and connected with the sliding pillar 30, respectively, for driving the sliding pillar 30 to reciprocate along the Z-axis direction of the main body 10. In the embodiments of the present invention, the power source 70 is a motor.

The sliding pillar 30 passes through the housing 21 of the sliding seat 20. One lateral side of the sliding pillar 30 facing the Z-axis direction of the main body 10 is provided with a protruding rail 31. The other three lateral sides of the sliding pillar 30 excluding the side provided with the protruding rail 31 are provided with at least one sliding device 60, respectively, wherein each sliding device 60 is provided with a sliding groove 61 and a sliding rail 62. Each sliding groove 61 is concavely disposed on an inner lateral side of the housing 21 along the Z-axis direction of the main body 10, respectively. Each sliding rail 62 is disposed on a lateral side of the sliding pillar 30 along the Z-axis direction of the main body, respectively. Therefore, the sliding pillar 30 and the sliding seat 20 are slidingly matched in a more stable combination manner. When the sliding pillar 30 moves along the Z-axis direction of the main body 10, shaking between the sliding pillar 30 and the sliding seat 20 less possibly occurs. Power source 70 triggers the sliding pillar 30 to reciprocate through the sliding device 60 along the Z-axis direction of the main body 10. In the embodiments of the present invention, three lateral sides of the sliding pillar 30 excluding the side provided with the protruding rail 31 is provided with one sliding device 60, respectively. When the present invention is disposed on a relatively larger bridge type machining center, the sliding pillar 30 is larger in the volume thereof, and the amount of the sliding device 60 provided on the three lateral sides of the sliding pillar 30 other than the side provided with the protruding rail 31 is increased to two.

The assistant plate 40 is connected with the sliding seat 20 and disposed on one side of the main body 10. The assistant plate 40 is formed in a U shape, wherein the concave thereof faces the protruding rail 31 of the sliding pillar 30. The bottom face of the assistant plate 40 is slidingly disposed on the third linear rail 143 of the second beam 13. Also, a through hole 41 passes through the assistant plate 40. In an embodiment of the present invention, the through hole 41 is formed in a non-circular shape, and the amount of the through hole 41 provided is two, while the two through holes 41 are disposed on the assistant plate 40 and arranged in vertical along the Z-axis direction of the main body, respectively.

The adjusting unit 50 passes through the assistant plate 40. In an embodiment of the present invention, the amount of the adjusting unit 50 provided is two, while the two adjusting units 50 are disposed on the assistant plate 40 and arranged in vertical along the Z-axis direction of the main body, respectively. Each of the adjusting unit 50 comprises one resisting member 51 and one correcting member 52. The correcting member 52 is screwedly combined with the corresponding resisting member 51. The correcting member 52 is disposed on the outer lateral side of the assistant plate 40 opposite to the side thereof facing the protruding rail 31; the resisting member 51 passes through the corresponding through hole 41 the assistant plate 40 and pushes against the protruding rail 31. The two resisting members 51 and the two correcting members 52 are vertically arranged along the Z-axis direction of the main body 10 and disposed on the assistant plate 40, and the two resisting members 51 push against the protruding rail 31.

Furthermore, one side of the resisting member 51 is provided with a combining portion 511 and a rolling portion 512 oppositely disposed against the combining portion 511. The combining portion 511 passes through the through hole 41 of the assistant plate 40 to be fastened with the correcting member 52, while the rolling portion 512 pushes against the protruding rail 31. The combining portion 511 is formed in a non-circular shape, and the shape of the outer periphery of the combining portion 511 matches with the shape of the through hole 41, so as to prevent the resisting member 51 from rotating against the correcting member 52. In addition, the rolling portion 512 includes plural needle rollers 513. When the sliding pillar 30 moves along the Z-axis direction of the main body 10, the rolling portion 512 decreases the friction produced by the sliding pillar 30 movement, whereby the sliding pillar 30 movement along the Z-axis direction of the main body 10 is smoothly facilitated.

The correcting member 52 is provided with a moderating portion 521, while the moderating portion 521 pushes against the assistant plate 40. The moderating portion 521 defines a correcting distance L between the correcting member 52 and the assistant plate 40. By adjusting the correcting distance L, the resisting member 51 moves along the Y-axis direction of the main body 10, and the position of the sliding pillar 30 in the housing 21 is adjusted. In an embodiment of the present invention, the correcting member 52 is formed in a U shape.

The moderating portion 521 is disposed on two lateral sides of the correcting member 52, and the thickness of the moderating portion 521 defines the length of the correcting distance L. The thickness of the moderating portion 521 is allowed to be adjusting by grinding. The ground thickness of the moderating portion 521 is thinner, such that the correcting distance L varies into a correcting distance L1.

Referring to FIG. 3 and FIG. 6 to FIG. 9, when the present invention moves along the Y-axis direction of the main body 10 and causes a tool collision to occur upon the sliding pillar 30, a bias angle θ is thus produced between an axis A axially extending from the sliding pillar 30 and a vertical line B extending along the Z-axis direction of the main body 10. By grindingly processing the thickness of the moderating portion 521 of the correcting member 52, the correcting distance L is moderated into the correcting distance L1, such that the resisting member 51 moves along the Y-axis direction of the main body 10 and pushes the sliding pillar 30, so as to correct the bias angle θ; therefore, the axis A of the sliding pillar 30 and the vertical line B of the main body 10 are arranged in alignment with each other.

With the sliding device 60 disposed between the sliding seat 20 and the sliding pillar 30, and the protruding rail 31 of the sliding pillar 30 pushed against by the resisting member 51 of the adjusting unit 50, when the present invention moves along the X-axis or Y-axis direction of the main body 10, the counterforce thereby produced is resisted, such that the sliding pillar 30 is able to move smoothly. Also, biasing of the sliding pillar 30 is prevented.

In addition, when a bias angle θ is produced due the a slight deformation caused by the tool collision upon the sliding pillar 30, the adjusting unit 50 provides a correcting mechanism, such that the axis A of the sliding pillar 30 and the vertical line B of the main body 10 are arranged in alignment with each other. With such mechanism, the known issue of the damage of sliding pillar 30 after a long period of usage due to incapability of immediately correcting the bias angle θ is improved. Therefore, the flexibility and convenience of the adjustment mechanism provided by the present invention is enhanced, and the service life of the present invention is increased.

Furthermore, because the present invention is applied to a large bridge type machining center with the height thereof between one to three meters and with relatively heavy overall weight. With the assistant plate 40 slidingly disposed on the second beam 13, the weight of the sliding seat 20 is not only supported by the first beam 12 but also indirectly supported by the second beam 13. Therefore, the sliding seat 20 is prevented from deforming due to a long period of usage. Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A sliding seat device with surrounding structure, comprising:
a main body provided with a sliding portion;
a sliding seat slidingly disposed on the sliding portion, the sliding seat reciprocating along an X-axis direction of the main body, the sliding seat provided with a housing;
a sliding pillar passing through the housing, the sliding pillar reciprocating along a Z-axis direction of the main body, one side of the sliding pillar provided with a protruding rail disposed along the Z-axis direction of the main body;
an assistant plate connected with the sliding seat and facing the protruding rail; and
an adjusting unit passing through the assistant plate and pushing against the protruding rail, the adjusting unit correcting a vertical bias between the sliding pillar and the main body.

2. The sliding seat device of claim 1, wherein three sides of the sliding pillar excluding the side provided with the protruding rail are provided with at least one sliding device, respectively, such that the sliding pillar reciprocates along the Z-axis direction of the main body by use of the at least one sliding device.

3. The sliding seat device of claim 2, wherein each sliding device is provided with a sliding groove and a sliding rail, each sliding groove concavely disposed in the housing along the Z-axis direction of the main body, each sliding rail disposed on one side of the sliding pillar along the Z-axis direction of the main body.

4. The sliding seat device of claim 1, wherein the adjusting unit is provided with a resisting member and a correcting member, the resisting member pushing against the protruding rail, the correcting member screwedly combined with the resisting member, respectively, and screwedly disposed on one side of the assistant plate opposite to the side of the assistant plate facing the protruding rail.

5. The sliding seat device of claim 4, wherein the correcting member comprises a moderating portion, the moderating portion pushing against the assistant plate and defining a correcting distance between the correcting member and the assistant plate, such that when the resisting member moves along the Y-axis direction of the main body, the correcting distance is adjusted.

6. The sliding seat device of claim 4, wherein the correcting member and the resisting member are disposed on the assistant plate along the Z-axis direction of the main body.

7. The sliding seat device of claim 4, wherein one side of the resisting member is provided with a combining portion and the other side of the resisting member is provided with a rolling portion in opposite to the combining portion, the combining portion passing through the assistant plate and being fastened with the correcting member, the rolling portion pushing against the protruding rail.

8. The sliding seat device of claim 7, wherein the rolling portion comprising plural needle rollers.

9. The sliding seat device of claim 1, wherein the sliding portion includes plural linear rails.

10. The sliding seat device of claim 9, wherein two sides of the main body is provided with a pillar, respectively, with plural beams transversely disposed between the two pillars, wherein the linear rails are disposed on one side of the beams.

11. The sliding seat device of claim 10, wherein a bottom of the assistant plate is slidingly disposed on one of the beams.

12. The sliding seat device of claim 11, wherein the beams comprises a first beam and a second beam, wherein the sliding seat is slidingly disposed on the first beam and the assistant plate is slidingly disposed on the second beam, wherein the first beam is disposed at a position higher than the second beam.

* * * * *